US012114825B2

(12) United States Patent
Kremmel

(10) Patent No.: US 12,114,825 B2
(45) Date of Patent: Oct. 15, 2024

(54) POCKET HANDLE SCREWLESS DESIGN

(71) Applicant: Haier US Appliance Solutions, Inc., Wilmington, DE (US)

(72) Inventor: Aldo Vincent Kremmel, Palmyra, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 437 days.

(21) Appl. No.: 17/522,301

(22) Filed: Nov. 9, 2021

(65) Prior Publication Data

US 2023/0145985 A1 May 11, 2023

(51) Int. Cl.
*A47L 15/42* (2006.01)
*E05B 1/00* (2006.01)
*E05B 5/00* (2006.01)

(52) U.S. Cl.
CPC ........ *A47L 15/4257* (2013.01); *E05B 1/0015* (2013.01); *E05B 5/00* (2013.01)

(58) Field of Classification Search
CPC ............. A47L 15/4257; A47L 15/4259; A47L 15/4265; D06F 37/28; D06F 39/14; A47B 95/02; A47B 2095/024
See application file for complete search history.

(56) References Cited

U.S. PATENT DOCUMENTS

| | | | | | |
|---|---|---|---|---|---|
| 2,771,627 | A * | 11/1956 | Hammer | ................ | A47B 95/02 16/416 |
| 9,803,389 | B2 | 10/2017 | Criner | | |
| 10,772,480 | B2 | 9/2020 | Ponkshe | | |
| 10,869,589 | B2 | 12/2020 | Kendall | | |
| 2010/0236589 | A1 | 9/2010 | House | | |

OTHER PUBLICATIONS

How To: Bosch/Thermador/ Gaggenau Door Handle 12012913, Aug. 3, 2019, http://www.youtube.com/watch?v=ZEqLZLpYEB0.

* cited by examiner

*Primary Examiner* — David G Cormier
(74) *Attorney, Agent, or Firm* — Dority & Manning, P.A.

(57) ABSTRACT

A household appliance includes a cabinet, a door, and a handle. The cabinet includes a plurality of panels and defines an internal chamber therein. The door includes a front panel and an interior panel, the front panel and the interior panel defining a door cavity between the front panel and the interior panel. The front panel may include a handle cavity edge. The front panel can define a handle cavity at the handle cavity edge. The handle cavity edge may include a plurality of flanges angled into the door cavity. The handle may be disposed in the handle cavity and may include an outer surface and an inner surface. The handle further may include a plurality of snaps located on a periphery of the inner surface. The snaps may be lodged against corresponding flanges and may attach the handle to the front panel of the door.

20 Claims, 15 Drawing Sheets

FIG. –5–

POCKET HANDLE SCREWLESS DESIGN

FIELD OF THE INVENTION

The present subject matter relates generally to appliances, and more particularly to appliance handles.

BACKGROUND OF THE INVENTION

In manufacturing, such as manufacturing appliances, parts can be put together in stages or steps. Each component added to a manufacturing piece can add a step to assembly and installation of the components into the manufacturing piece. Additionally, having many components in a manufacturing piece can complicate or extend repair time. For example, placing parts together by the use of screws takes time, both during manufacturing and when making repairs.

Door handles, such as pocket door handles, can be a separate piece of material. Such may be beneficial due to structure, cost, or features desired. Handles of this kind may be inserted into a front panel of a door from the inner side of the front panel. In some doors, such as dishwasher doors, this step must be performed prior to installing the door's inner panel with the front panel. This can result in an involved manufacturing process. A handle installed this way may be installed with several screws, which are each an extra part to source, each takes valuable installation time, and generally slow the process as screws may need to be aligned into their screw holes. Furthermore, installing a handle from the inside surface of the door panel does not allow the installer to have the benefit of added stability from the inner panel. In other words, the front door panel alone may not be as stable or sturdy as the door when both the panels are together, so more time may be needed to install parts while the front and inner door panels are not together.

Accordingly a door handle that is installed on a door panel without the use of a screw would be useful. Furthermore, a handle that could be installed from the outside surface of the door would also be desirable.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a household appliance is provided. The household appliance may include a cabinet. The cabinet may include a plurality of panels. The cabinet may define an internal chamber therein. The household appliance may further include a door mounted on the cabinet to selectively restrict access to the internal chamber in a closed position. The door may extend along the vertical direction in the closed position between a top lip and a bottom lip. The door may include a front panel and an interior panel. The front panel and the interior panel may define a door cavity between the front panel and the interior panel. The front panel may include a handle cavity edge. The front panel may define a handle cavity at the handle cavity edge. The handle cavity edge may include a plurality of flanges angled into the door cavity. The household appliance may further include a handle disposed in the handle cavity. The handle may include an outer surface and an inner surface. The handle may define a recess extending into the door cavity between the front panel and the interior panel. The handle may further include a plurality of snaps located on a periphery of the inner surface. The one or more snaps of the plurality of snaps may be lodged against one or more corresponding flanges of the plurality of flanges to attach the handle to the front panel of the door.

In another exemplary aspect of the present disclosure, a household appliance is provided. The household appliance may include a cabinet. The cabinet may include a plurality of panels. The cabinet may define an internal chamber therein. The household appliance may further include a door mounted on the cabinet to selectively restrict access to the internal chamber in a closed position. The door may include a front panel and an interior panel. The door may define a door cavity defined between the front panel and the interior panel. The front panel may include a handle cavity edge. The front panel may define a handle cavity at the handle cavity edge. The handle cavity edge may include a plurality of flanges angled into the door cavity. The household appliance may further include a handle attached to the door in the handle cavity. The handle may include an outer surface and an inner surface. The handle may define a recess at the handle cavity that extends into the door cavity between the front panel and the interior panel. The handle may further include a plurality of snaps located on a periphery of the inner surface. One or more snaps of the plurality of snaps may be lodged against one or more corresponding flanges of the plurality of flanges to attach the handle to the front panel of the door. The handle may further include a front lip. The front lip may extend beyond the handle cavity edge and onto the front panel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Use of the same of similar reference numerals in the figures denotes the same or similar features unless the context indicates otherwise.

DETAILED DESCRIPTION

Figure 1:
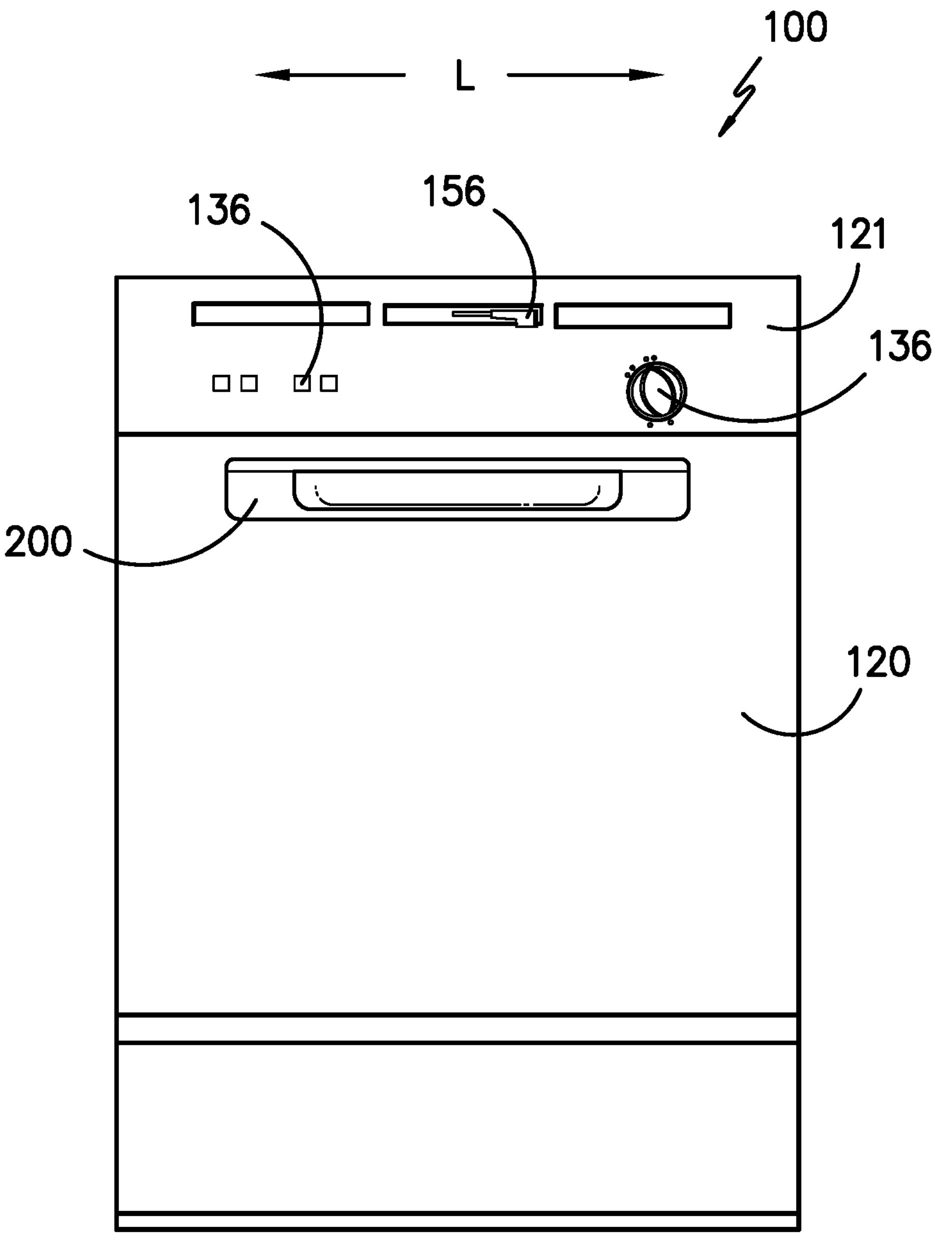
FIG. 1 provides a front elevation view of an exemplary embodiment of a dishwasher appliance of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

As used herein, the term "article" may refer to, but need not be limited to dishes, pots, pans, silverware, and other cooking utensils and items that can be cleaned in a dishwashing appliance. The term "wash cycle" is intended to refer to one or more periods of time during which a dishwashing appliance operates while containing the articles to be washed and uses a detergent and water, preferably with agitation, to e.g., remove soil particles including food and other undesirable elements from the articles. The term "rinse cycle" is intended to refer to one or more periods of time during which the dishwashing appliance operates to remove residual soil, detergents, and other undesirable elements that were retained by the articles. Such may be after completion of the wash cycle or may be a cycle unto itself. The term "drain cycle" is intended to refer to one or more periods of time during which the dishwashing appliance operates to discharge soiled water from the dishwashing appliance. The term "cleaning cycle" is intended to refer to one or more periods of time that may include a wash cycle, rinse cycle, or a drain cycle. The term "wash fluid" refers to a liquid used for washing or rinsing the articles and is typically made up of water that may include other additives such as detergent or other treatments. The term "rinse fluid" refers to a fluid used for rinsing the articles and is typically made up of water and may include other additives such as rinse aid solutions. The term "quick-wash" is intended to refer to the various features described in exemplary embodiments of the invention and does not limit the invention to any particular time period for using such features. The term "wash" is intended to refer or reference the fluid or process of adding detergent to water to remove dirt and particles from articles to be washed. The term "rinse" is intended to refer or reference the fluid or process of using water and potentially rinse aid additives to remove residual soil, detergents, or other undesirable elements that were retained by the articles.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
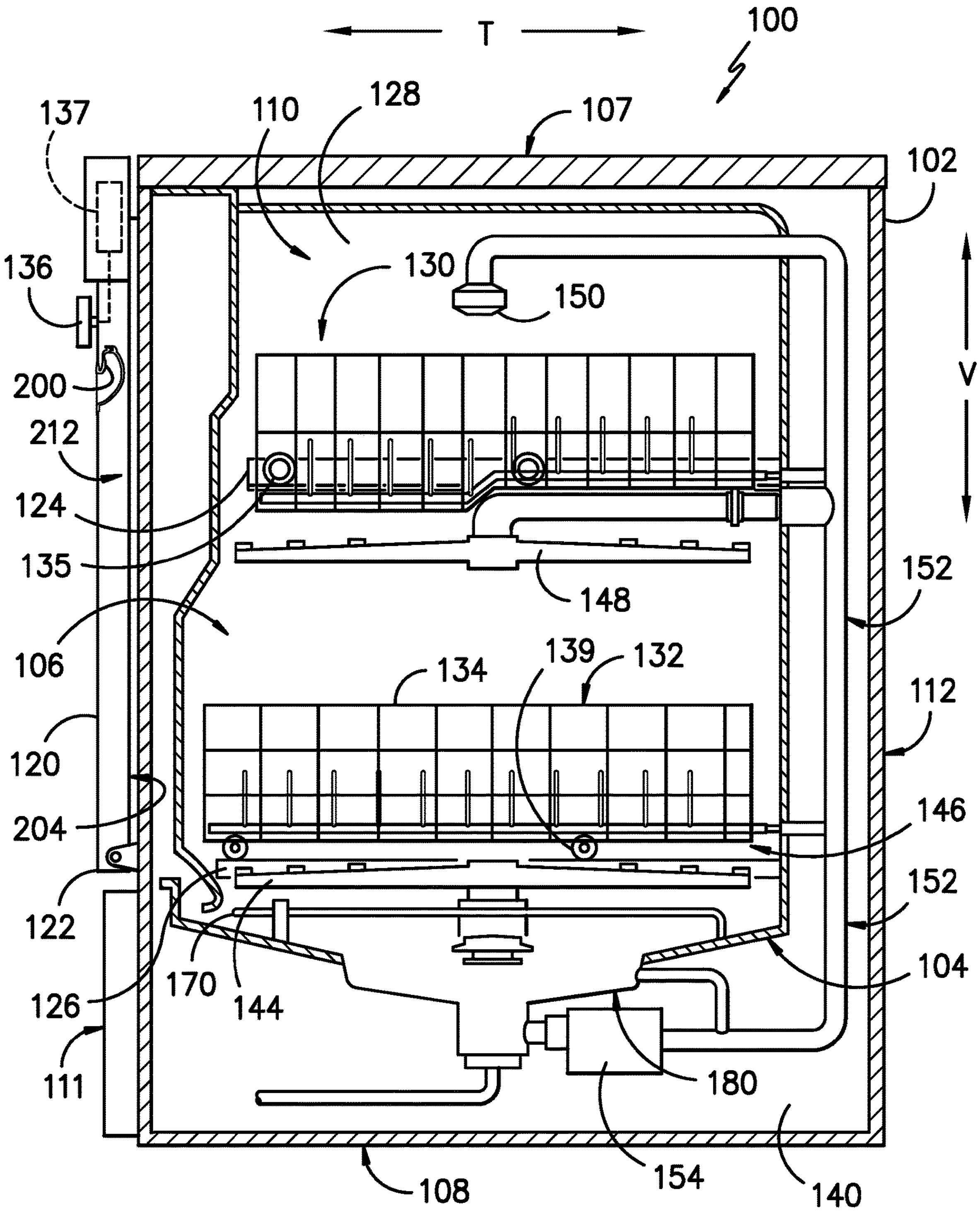
FIG. 2 provides a side, section view of the exemplary dishwasher appliance of FIG. 1.

FIGS. 1 and 2 depict an exemplary domestic dishwasher or dishwashing appliance 100 that may be configured in accordance with aspects of the present disclosure. For the particular embodiment of FIGS. 1 and 2, the dishwasher appliance 100 includes a cabinet 102 (FIG. 2) having a tub 104 therein that defines a wash chamber 106, wash chamber 106 being an interior chamber. As shown in FIG. 2, tub 104 extends between a top 107 and a bottom 108 along a vertical direction V, between a pair of opposing side walls 110 along a lateral direction L, and between a front side 111 and a rear side 112 along a transverse direction T. Each of the vertical direction V, lateral direction L and transverse direction T are mutually perpendicular to one another.

In this regard, as used herein, the terms "cabinet," "housing," and the like are generally intended to refer to an outer frame or support structure for appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of appliance 100. By contrast, cabinet 102 may enclose some or all portions of an interior of cabinet 102. It should be appreciated that cabinet 102 may have any suitable size, shape, and configuration while remaining within the scope of the present subject matter.

The tub 104 includes a front cabinet opening (not shown) and a door 120 hinged at its bottom 122 for movement between a normally closed vertical position (shown in FIGS. 1 and 2), wherein the wash chamber 106 is sealed shut for washing operations, and a horizontal open position for loading and unloading of articles from the dishwasher 100. Door is mounted on cabinet 102 to selectively restrict access to the internal chamber (e.g., wash chamber 106) in a closed position. Door includes handle 200, which will be described in more detail below. Latch 156 is used to lock and unlock door 120 for access to wash chamber 106.

At least one rack assembly is slidably positioned within wash chamber 106 and is configured for the receipt of articles for cleaning. For the exemplary embodiment shown in FIG. 2, opposing tub side walls 110 accommodate a plurality of rack assemblies. More specifically, upper and lower guide rails 124, 126 are mounted on tub side walls 128 and accommodate roller-equipped rack assemblies 130 and 132. Each of the rack assemblies 130, 132 may be fabricated into lattice structures including a plurality of elongated members 134 (for clarity of illustration, not all elongated members making up assemblies 130, 132 are shown in FIG. 2). Each rack assembly 130, 132 is adapted for movement between an extended loading position (not shown), in which the rack 130 or 132 is substantially positioned outside the wash chamber 106, and a retracted position (shown in FIGS. 1 and 2), in which the rack 130 or 132 is located inside the wash chamber 106. This rack movement is facilitated by rollers 135 and 139, for example, mounted onto racks 130 and 132, respectively. A silverware basket (not shown) may be removably attached to rack assembly 132 for placement of silverware, utensils, and the like that are otherwise too small to be accommodated by the racks 130, 132. Although guide rails 124, 126 and rollers 135, 139 are illustrated herein as facilitating movement of the respective rack assemblies 130, 132, it should be appreciated that any suitable sliding mechanism or member may be used according to alternative embodiments. In some embodiments, dishwasher appliance 100 may accommodate a different number of rack assemblies and supporting guide rails. For example, dishwasher appliance 100 may accommodate only first rack assembly 130 with accompanying guide rails. In another example, dishwasher appliance 100 may accommodate a third rack assembly (not pictured) with accompanying guide rails. The third rack assembly may be located vertically above rack assemblies 130, 132.

At least one spray assembly is located in wash chamber 106 and is configured to direct wash fluids onto at least one rack assembly for washing articles located therein. For the exemplary embodiment of FIG. 2, dishwasher appliance 100 further includes a plurality of spray assemblies 144, 148, 150 for urging a flow of water or wash fluid onto the articles placed within wash chamber 106. More specifically, as illustrated in FIG. 2, dishwasher appliance 100 includes a lower spray-arm assembly 144 that is rotatably mounted within a lower region 146 of the wash chamber 106 and above a tub sump assembly 180 so as to rotate in relatively close proximity to rack assembly 132. Additionally or alternatively, a mid-level spray-arm assembly 148 may be located in an upper region of the wash chamber 106 and may be located in close proximity to upper rack 130. Also additionally or alternatively, an upper spray assembly 150 may be located above the upper rack 130.

The lower and mid-level spray-arm assemblies 144, 148 and the upper spray assembly 150 may be part of a fluid circulation assembly 152 for circulating water and dishwasher fluid in the tub 104. The fluid circulation assembly 152 may also include a recirculation pump 154 positioned in a machinery compartment 140 located below the tub sump assembly 180 (e.g., bottom wall) of the tub 104. Pump 154 may receive fluid from sump assembly 180 to provide a flow to fluid circulation assembly 152, or optionally, a switching valve or diverter (not shown) may be used to select flow. In some embodiments, a heating element 170 can be used to provide heat during e.g., a drying cycle.

Each spray-arm assembly 144, 148 may include an arrangement of discharge ports or orifices for directing washing fluid received from pump 154 onto dishes or other articles located in rack assemblies 130 and 132. The arrangement of the discharge ports in spray-arm assemblies 144, 148 can provide a rotational force by virtue of washing fluid flowing through the discharge ports. The resultant rotation of the spray-arm assemblies 144, 148 and the operation of spray assembly 150 using fluid from pump 154 provides coverage of dishes and other dishwasher contents with a washing spray. Other configurations of spray assemblies may be used as well.

The dishwasher 100 is further equipped with a controller 137 to regulate operation of the dishwasher 100. The controller may include one or more memory devices and one or more microprocessors, such as general or special purpose microprocessors operable to execute programming instructions or micro-control code associated with a cleaning cycle. The memory may represent random access memory such as DRAM or read only memory such as ROM or FLASH. In one embodiment, the processor executes programming instructions stored in memory. The memory may be a separate component from the processor or may be included onboard within the processor. Alternatively, controller 137 may be constructed without using a microprocessor, e.g., using a combination of discrete analog or digital logic circuitry (such as switches, amplifiers, integrators, comparators, flip-flops, AND gates, and the like) to perform control functionality instead of relying upon software.

The controller 137 may be positioned in a variety of locations throughout dishwasher 100. In the illustrated embodiment, the controller 137 may be located within a control panel area 121 of door 120 as shown in FIGS. 1 and 2. In some such embodiments, input/output ("I/O") signals may be routed between the controller 137 and various operational components of dishwasher 100 along wiring harnesses that may be routed through the bottom 122 of door 120. Typically, the controller 137 includes a user interface panel/controls 136 through which a user may select various operational features and modes and monitor progress of the dishwasher 100. In some embodiments, the user interface 136 represents a general purpose I/O ("GPIO") device or functional block. In additional or alternative embodiments, the user interface 136 includes input components, such as one or more of a variety of electrical, mechanical, or electro-mechanical input devices including rotary dials, push buttons, and touch pads. The user interface 136 may include a display component, such as a digital or analog display device designed to provide operational feedback to a user. The user interface 136 may be in communication with the controller 137 via one or more signal lines or shared communication busses.

Dishwasher appliance 100 may also be configured to communicate wirelessly with a cloud-server that may include a database or may be, e.g., a cloud-based data storage system and may also include image recognition and processing capabilities including artificial intelligence as further described below. For example, appliance 100 may communicate with cloud-server over the Internet, and appliance 100 may access via WI-FI®, such as from a WI-FI® access point in a user's home or through a mobile device. Alternatively, dishwasher appliance 100 may be equipped with such image recognition and processing capabilities as part of controller 137 or other components onboard appliance 100.

It should be appreciated that the invention is not limited to any particular style, model, or configuration of dishwasher appliance 100. The exemplary embodiment depicted in FIGS. 1 and 2 is for illustrative purposes only. For example, different locations may be provided for user interface 136, different configurations, including providing one or more rack assemblies 130, 132 and one or more spray assemblies 144, 148, to dishwasher appliance 100 may be used, different configurations may be provided for rack assemblies 130, 132 different spray assemblies 144, 148 and spray manifold configurations may be used, and other differences may be applied while remaining within the scope of the present subject matter.

As will be understood by those skilled in the art, dishwasher appliance 100 is provided by way of example only, and the present subject matter may be used in any suitable household appliance. Thus, present subject matter may further be used with other household appliances having different configurations such as microwave ovens, washing machine appliances, dryer appliances, refrigerator appliances, etc. Dishwasher appliance 100 will be described below, with the understanding that other embodiments may include or be provided as another suitable household appliance (e.g., defining an internal chamber).

Figure 3:
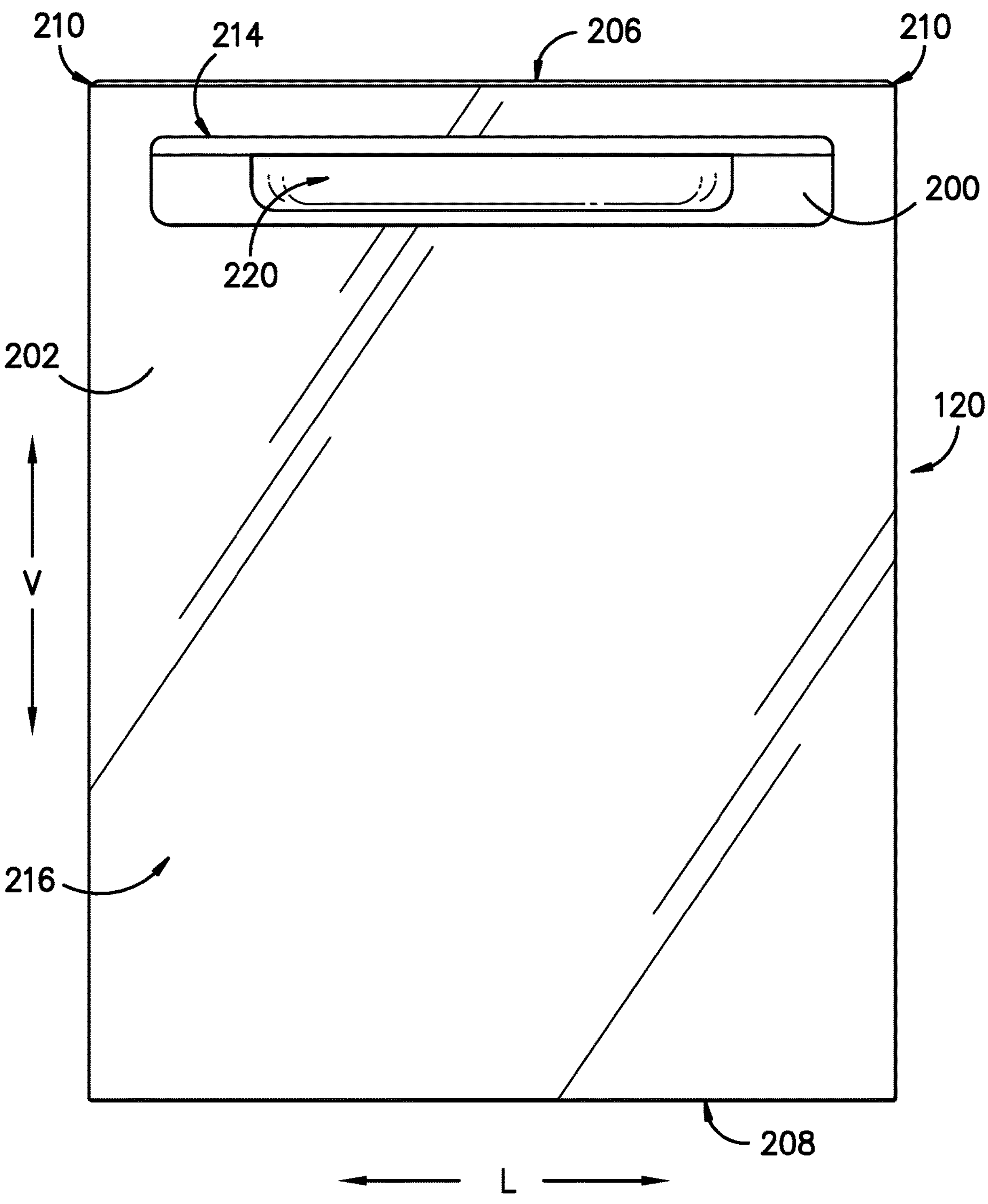
FIG. 3 provides a front elevation view of an exemplary door of the exemplary dishwasher appliance of FIG. 1.

Turning to FIGS. 2 and 3, door 120 includes a front panel 202 and an interior panel 204. Door 120 extends between front panel 202 and interior panel 204 in the transverse direction T, extends between a top lip 206 and a bottom lip 208 in the vertical direction and extends laterally between side panels 210 when in the closed position. As shown, door 120 defines a door cavity 212, the door cavity 212 defined as between front panel 202 and interior panel 204, door cavity 212 extending transversely into the door when the door is in the closed position. Door cavity 212 is internal to door 120. In the illustrated embodiment, door further includes a front surface 216. Front surface 216 is an outward surface of front panel 202, and the transversely forward surface of door 120 when door 120 is in the closed position. It is noted that directions discussed with respect to FIGS. 2 through 17 are hereafter defined in relation to door 120 in the closed position (FIG. 2), as such directions may be analogous, unless otherwise indicated, to those described above with respect to the tub 104 and cabinet 102.

Exemplary embodiments of the present description may advantageously allow a handle to be installed on door 120 from front surface 216 of front panel 202. Furthermore, embodiments disclosed herein may advantageously facilitate installation a handle without the use of screws. In other words, the connection between the handle and the rest of the door 120 may be notably free of any screws. Exemplary embodiments may be useful for easier installation or repair or replacement of the handle on the door 120 due, for example, to front panel assembly location or the lack of use of screws during installation.

Door cavity 212 extends internal to door 120. In some embodiments, door cavity 212 extends transversely between front panel 202 and interior panel 204. In some embodiments, door cavity 212 extends laterally and transversely within door 120, with front panel 202 and interior panel 204 defining two of the edges thereof. Door cavity 212 is defined as the space interior to door 120. Door cavity 212 is within door 120. Door cavity 212 is defined transversely forward by front panel 202 and transversely rearward by interior panel 204. Door cavity 212 is transversely in front of wash chamber 106 when door 120 is in the closed position.

Figure 14:
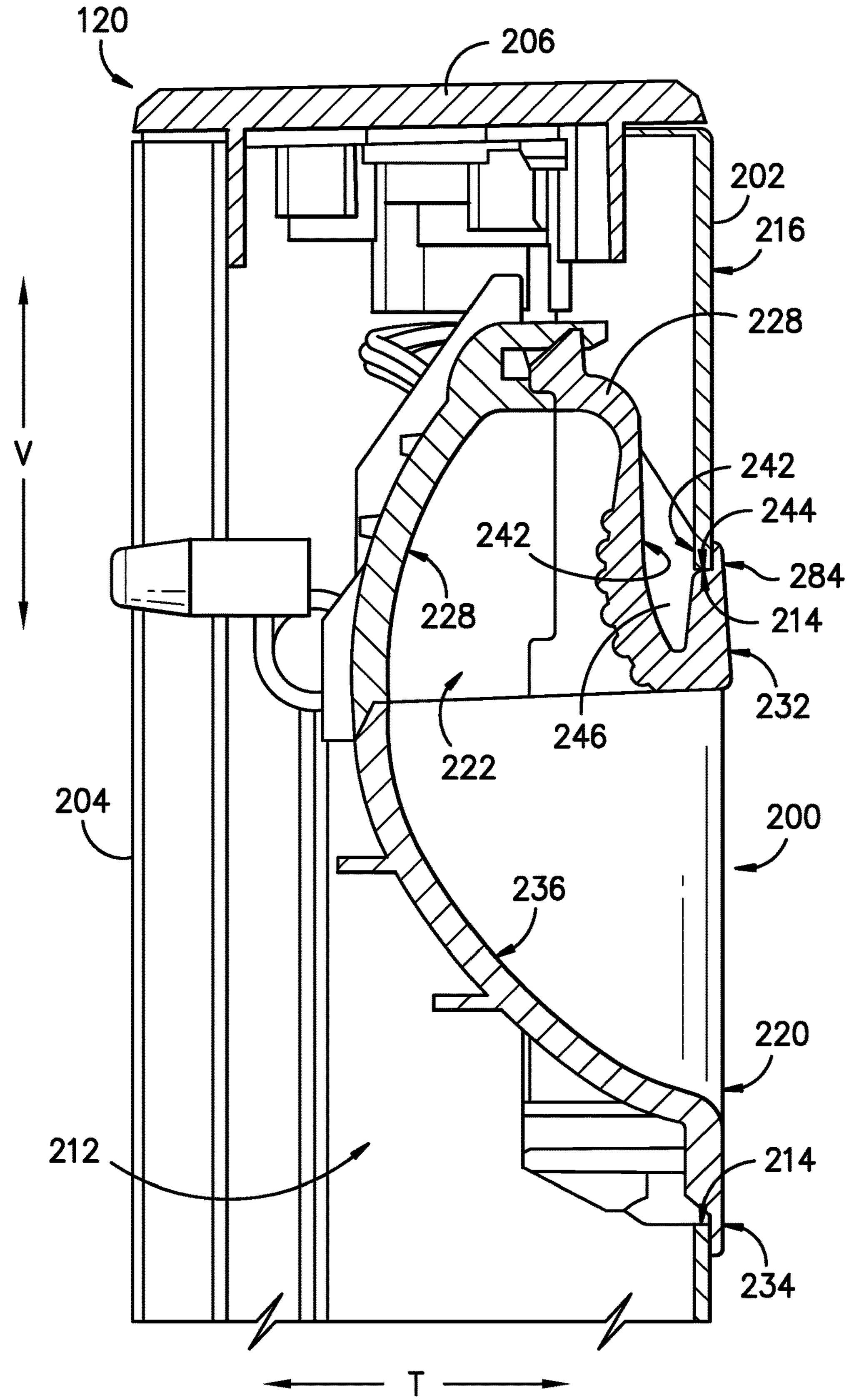
FIG. 14 provides a side section view of the exemplary pocket handle and exemplary door of FIGS. 3 and 4.

In some embodiments, front panel 202 defines a handle cavity edge 214, which may be a terminal edge or lip of front panel 202 radially inward from the perimeter or an outer edge of front panel 202. For instance, handle cavity edge 214 may extend continuously about a void radially inward from an outer edge of front panel 202. The void about which handle cavity edge 214 extends may, at least in part, define a handle cavity 220. Handle cavity edge 214 may, in turn, extend around handle cavity 220. Additionally or alternatively, front panel 202 may define a handle cavity 220 at handle cavity edge 214 (as shown in FIG. 14). As shown in FIG. 3, handle cavity 220 extends vertically and laterally when door 120 is in the closed position. In some embodiments, handle cavity 220 further extends transversely into (e.g., as part of) door cavity 212. In some embodiments, handle cavity edge 214 defines at least a portion of the handle cavity 220. In some embodiments, handle cavity edge 214 defines a portion of handle cavity 220 with door cavity 212.

On front panel 202, door 120 further includes handle 200. Handle 200 attaches to handle cavity edge 214. In some embodiments, handle 200 is disposed in handle cavity 220. Handle 200 may be located only partially inside handle cavity 220 to be disposed within handle cavity 220. Portions of handle 200 may be external to handle cavity 220, as will be described in more detail below. In some embodiments, handle 200 defines a recess 222. In some embodiments, at least a portion of handle 200 extends into door cavity 212. In some embodiments, handle 200 surrounds handle cavity edge 214. As shown in FIGS. 2 and 3, handle may be located in a vertical upper half of front panel 202. In some embodiments, handle 200 covers a majority of a length of front panel 202. For example, handle 200 may extend lengthwise across front panel 202 (e.g., such that handle 200 extends proximate to side panels 210 on either side). In certain embodiments, handle 200 may have a different location or size, depending on the needs of those particular embodiments. Optionally, handle 200 may be further characterized as a recessed or pocket handle, with a recess 222 extending into door 120, the recess 222 defined by handle 200.

Turning to FIGS. 4 through 11, handle 200 is attached to door 120 at handle cavity edge 214. Handle 200 further is attached by snaps 230 attaching to one or more corresponding flanges 240. Snaps 230 attach handle 200 to front panel 202 of door 120. As shown, handle 200 is not attached to door 120 with screws. In some embodiments, handle 200 is advantageously attached to door 120 without a screw (e.g., directly securing the handle 200 to door 120). In some embodiments, handle 200 allows a user to open or close door 120 on cabinet 102.

Handle 200 includes an outer surface 224 and an inner surface 226 (e.g., outer surface 224 may be defined as the surface on handle 200 that is visible or touchable when handle 200 is installed on door 120 whereas inner surface 226 may be the surface internal to door 120 and not visible or touchable when handle 200 is installed on door 120). Handle 200 further includes a handle interior panel 228, a handle exterior panel 232, a handle lip 234 and a handle pocket panel 236. As shown especially in FIG. 7, and as will be described in greater detail below, handle 200 further includes a plurality of snaps 230 located on a periphery of the inner surface 226. Handle lip 234 extends around outer surface 224 of handle 200, extending beyond handle cavity edge 214 and on to front panel 202. In some embodiments, handle lip 234 is proud of front panel 202. Furthermore, handle 200 defines recess 222, which extends into door cavity 212. Handle 200 parts will be described in more detail below.

Recess 222, defined by handle 200, is a void located on handle 200 that extends into, and sometimes upwards and into door 120. Recess 222 allows a user to grasp handle 200, inserting a hand, or a portion of a hand, into handle 200, to use handle 200 to move door 120 (e.g., open or close door 120) . . . . When assembled, recess 222 extends transversely into door 120. In some embodiments, recess 222 further extends vertically behind front panel 202 and into door cavity 212 (as is shown in FIG. 14). In some embodiments, recess extends vertically behind front surface 216 of door 120. Recess 222 extends beyond front panel 202 in transverse and vertical directions T and V. Additionally or alternatively, recess 222 may extend vertically into the door 120, extending internally beyond front panel 202. In some embodiments, recess 222 is formed by outer surface 224 extending transversely behind front panel 202 at handle cavity edge 214. In certain embodiments, outer surface 224 extends vertically above handle cavity edge 214 and transversely behind front panel 202.

Recess 222 is generally defined by outer surface 224. Outer surface 224 generally extends inward from handle cavity edge 214, and may also extend behind handle cavity edge 214, and said extension inward and sometimes behind defines recess 222. For instance, recess 222 may be further defined by outer surface 224 on handle interior panel 228 and handle pocket panel 236. In some embodiments, recess 222 permits a user to insert a hand into recess 222 to grasp handle 200 and pull or push door 120 open or closed.

When assembled, outer surface 224 is located external to door 120. Outer surface 224 includes the outer surface on handle exterior panel 232, handle lip 234, and handle pocket panel 236. In some embodiments, outer surface 224 includes the surface located inside recess 222 that is accessible from front panel 202. Outer surface 224 is attached to front surface 216 at handle cavity edge 214.

Figure 4:
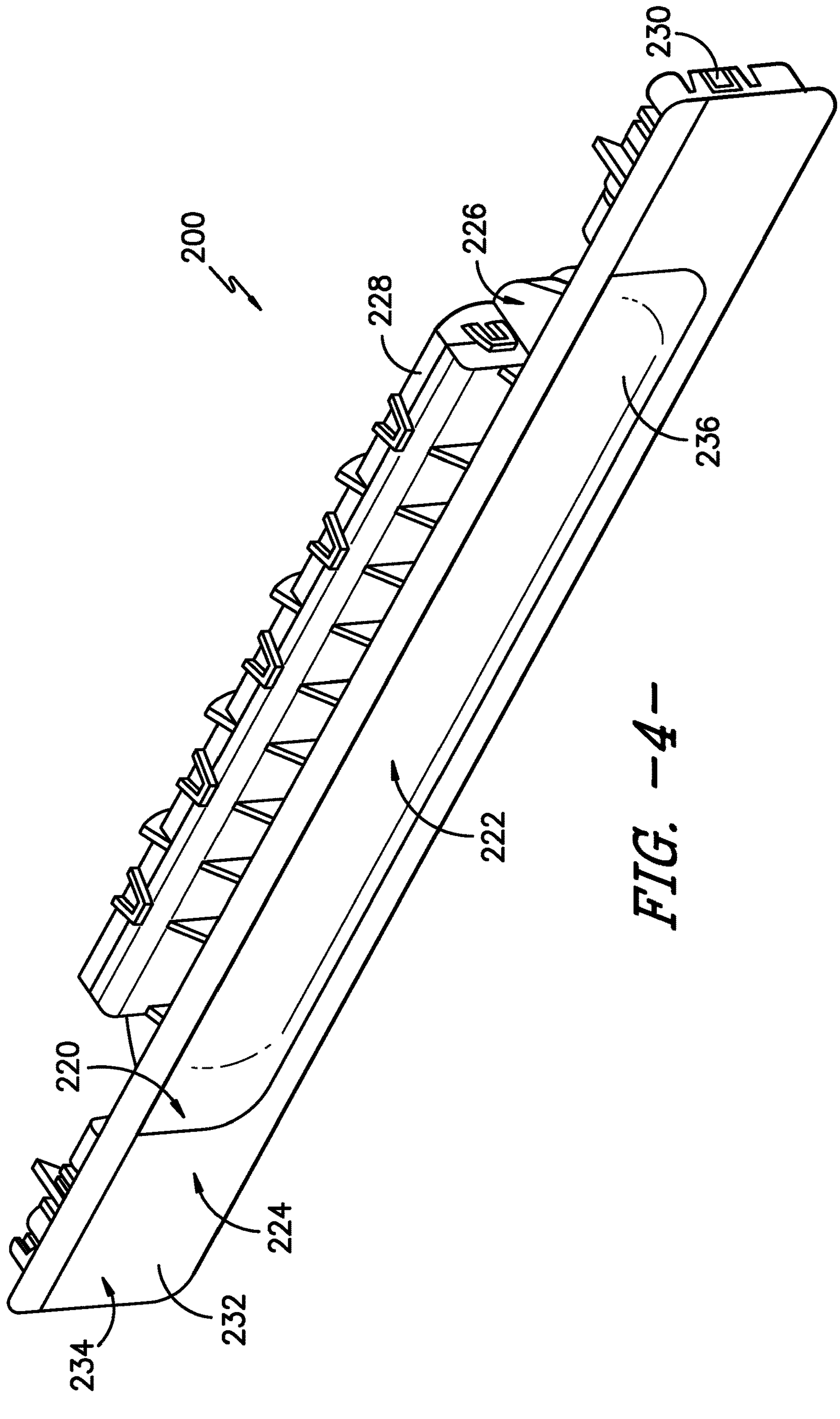
FIG. 4 provides a perspective view of an embodiment of an exemplary pocket handle of the exemplary door of FIG. 3.
Figure 5:
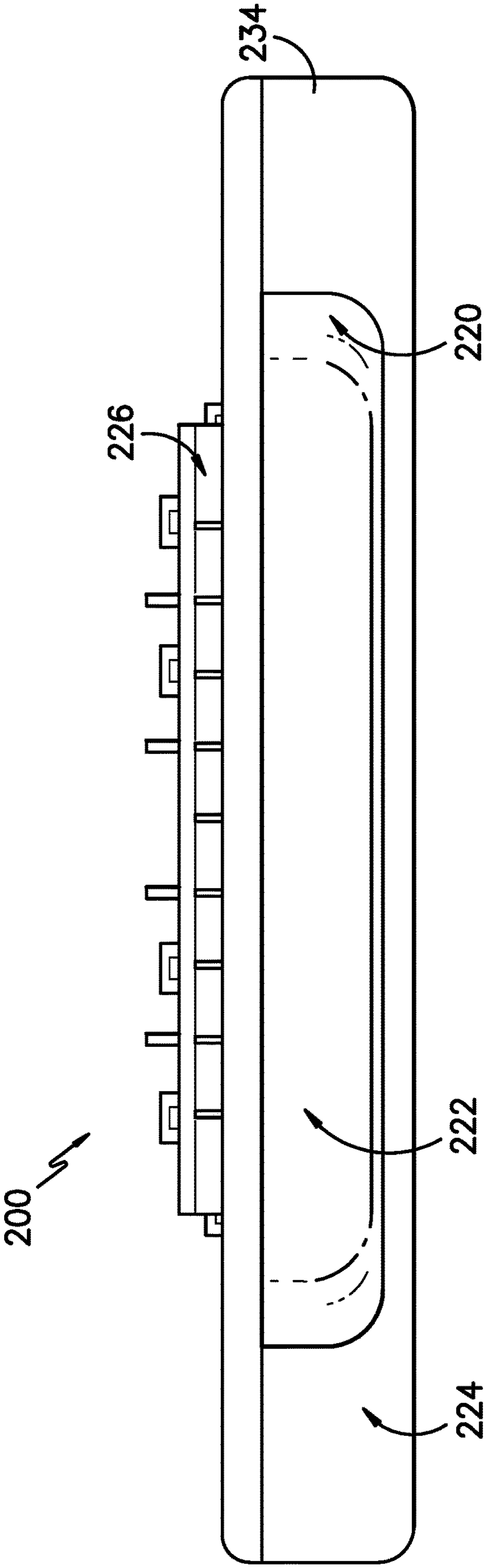
FIG. 5 provides a front elevation view of the exemplary pocket handle of FIG. 4.

In the illustrated embodiment of FIGS. 4 and 14, handle interior panel 228 extends into door cavity 212, transversely behind handle exterior panel 232 and behind front panel 202 of door. Handle interior panel 228 connects to handle exterior panel 232 and to handle pocket panel 236, forming a continuous handle surface on outer surface 224 of handle 200. In optional embodiments, handle interior panel 228 further defines recess 222, as handle interior panel 228 extends into door cavity 212 and defines the back and inner walls that define recess 222.

Inner surface 226 is located internal to door 120. In certain embodiments, inner surface 226 includes the plurality of snaps 230. In particular, the plurality of snaps 230 may be located around the periphery of inner surface 226. Generally, the periphery of surface 226 is an area that when the handle is installed, is disposed roughly around or along handle cavity edge 214. In some embodiments, snaps 230 are located on a majority of the periphery of inner surface 226. For example, snaps 230 may be located along the periphery of inner surface 226 In some embodiments, snaps 230 are located on all sides of the periphery of the inner surface 226. For example, snaps 230 may be located on an upper, bottom, and opposing sides of inner surface 226, the upper, bottom, and opposing sides comprising the periphery of inner surface 226. Snaps 230 may be located along periphery, spaced apart at intervals along the periphery of inner surface 226. In certain embodiments, snaps 230 are located at discrete positions along the periphery of inner surface 226.

Figure 6:
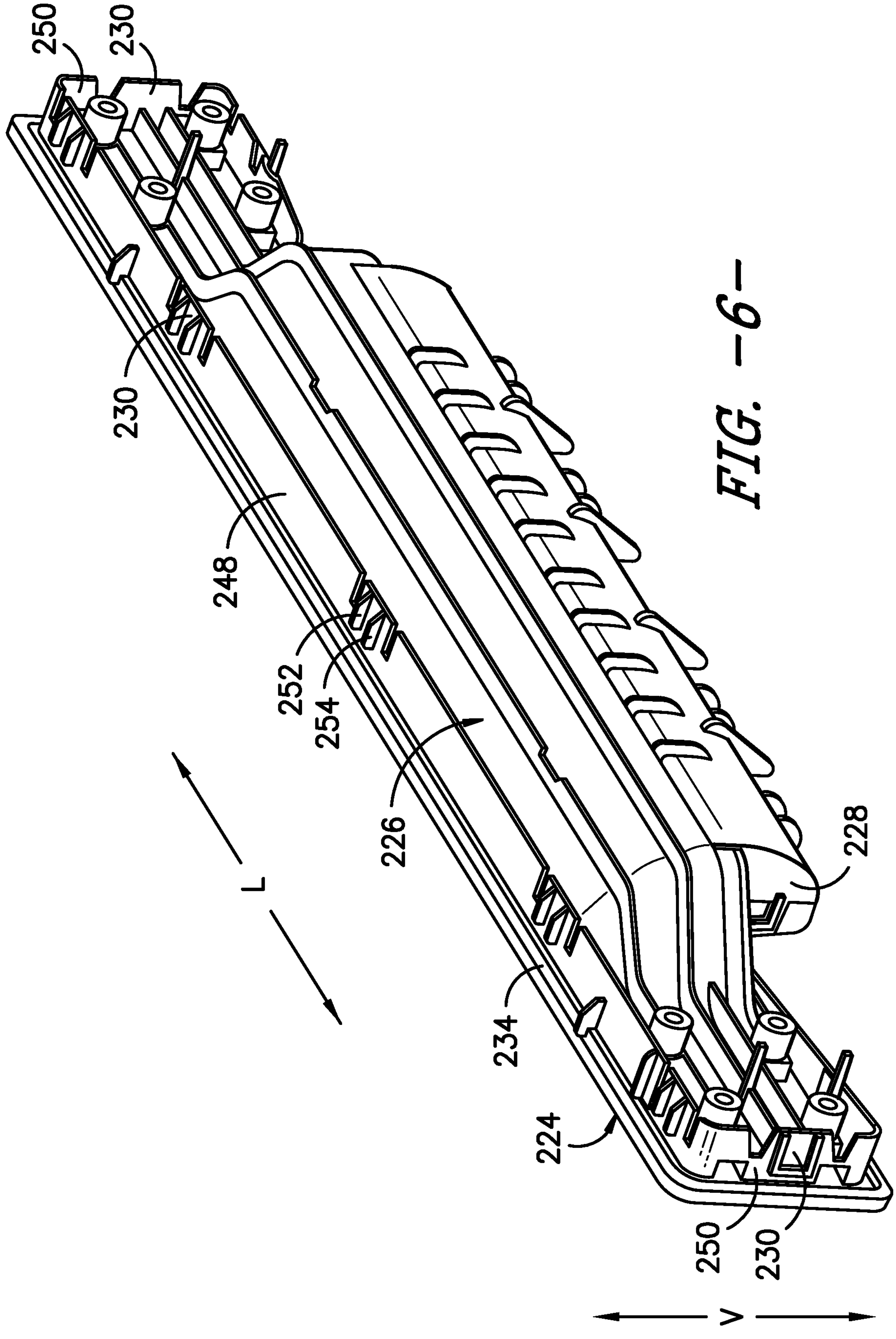
FIG. 6 provides a rear perspective view of the exemplary pocket handle of FIG. 4.
Figure 7:
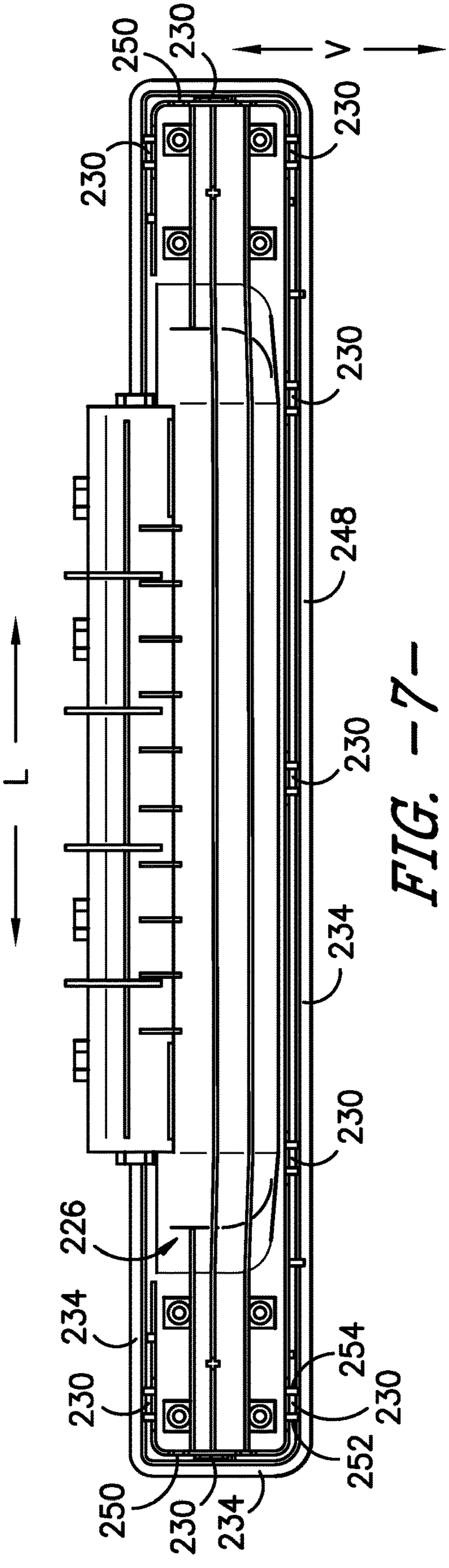
FIG. 7 provides a rear elevation view of the exemplary pocket handle of FIG. 4.
Figure 8:
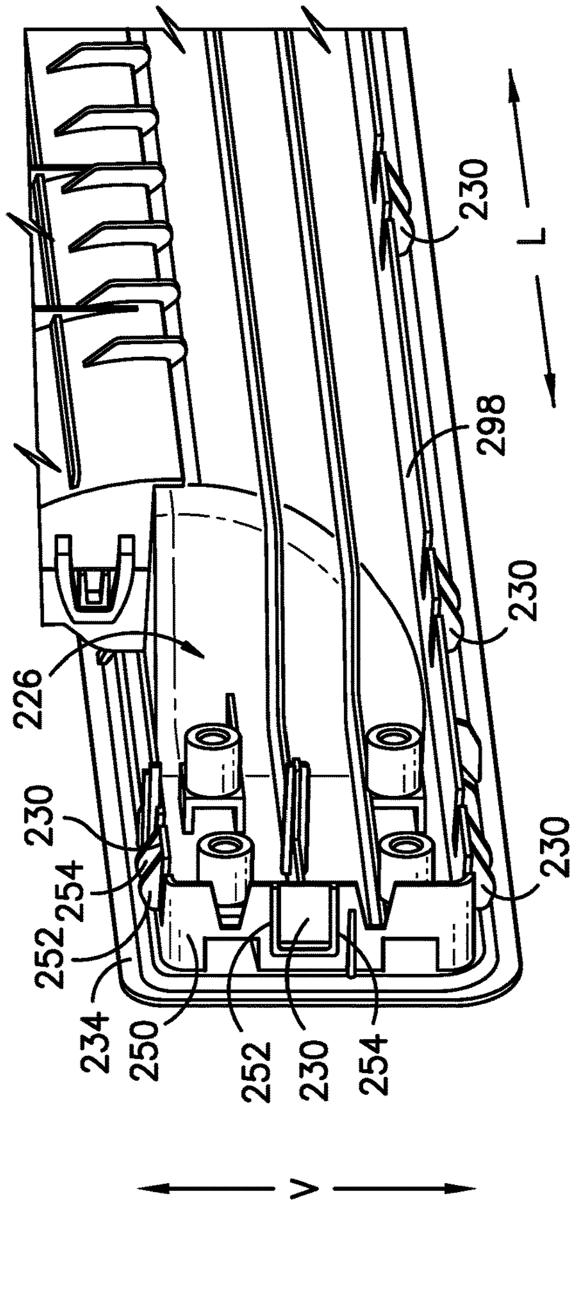
FIG. 8 provides a rear perspective view of a portion of the exemplary pocket handle of FIG. 4.

Turning generally to FIGS. 6 through 17, snaps 230 are attached to the inner surface 226 of handle 200 around the periphery of the inner surface 226. As shown in FIGS. 6 through 8, snaps 230 may be placed along a lower lateral length 248 of inner surface 226 of handle 200, spaced apart along lower lateral length 248. Additionally or alternatively, one or more snaps 230 may further be placed along vertical sides 250 of inner surface 226 of handle 200. In some embodiments, snaps may further be placed along an upper lateral length of inner surface 226 of handle 200 (not shown). In some embodiments, and snaps may be located on lower lateral length 248 and vertical sides 250.

Figure 12:
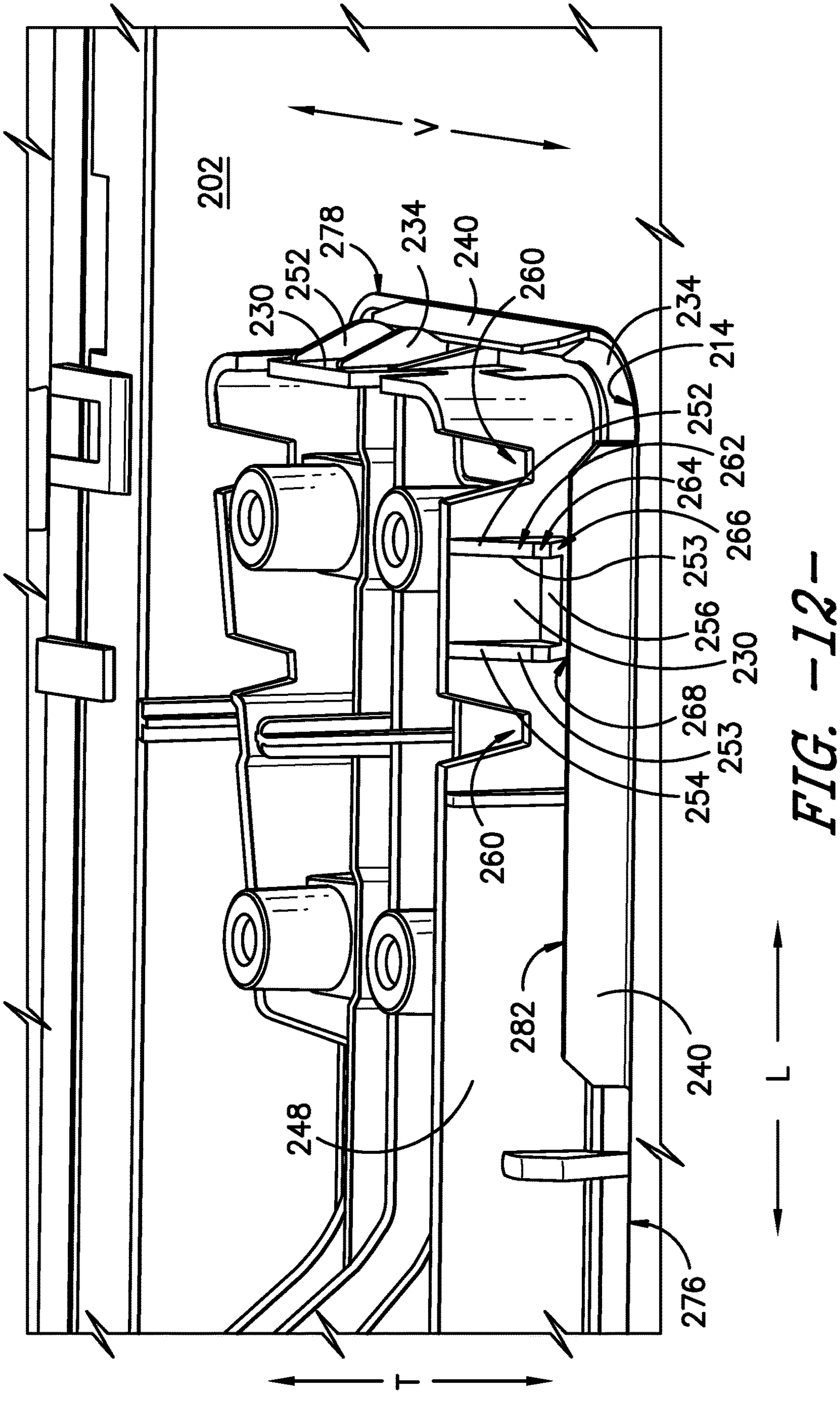
FIG. 12 provides a perspective rear view of an exemplary back of the exemplary door of FIG. 3.
Figure 13:
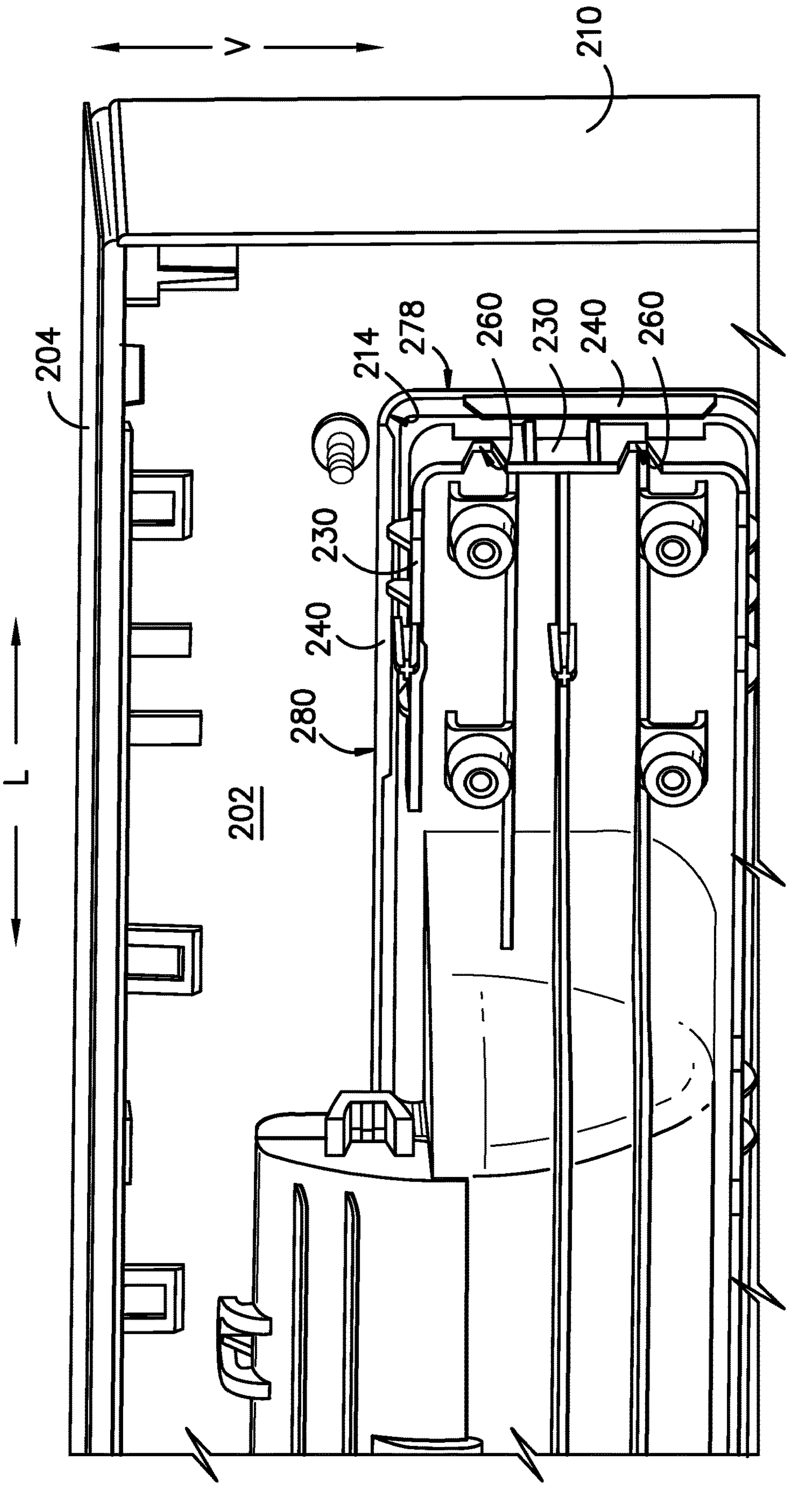
FIG. 13 provides an alternate perspective rear view of the exemplary back of the exemplary door of FIGS. 3 and 12.

As shown in FIGS. 12 and 13, snaps 230 lodge against corresponding flanges 240 to attach handle 200 to front panel 202 of door 120. In some embodiments, snaps 230 are placed in intervals along lower length 248 and along vertical sides 250. In certain embodiments, the plurality of snaps 230 is 3 or more snaps. In certain other embodiments, the plurality of snaps is 9 or more snaps. More snaps 230 may be desired, for example, for different applications and may vary according to the size of handle 200, the size of snaps 230, or the desired strength, depending on specific embodiments.

Figure 9:
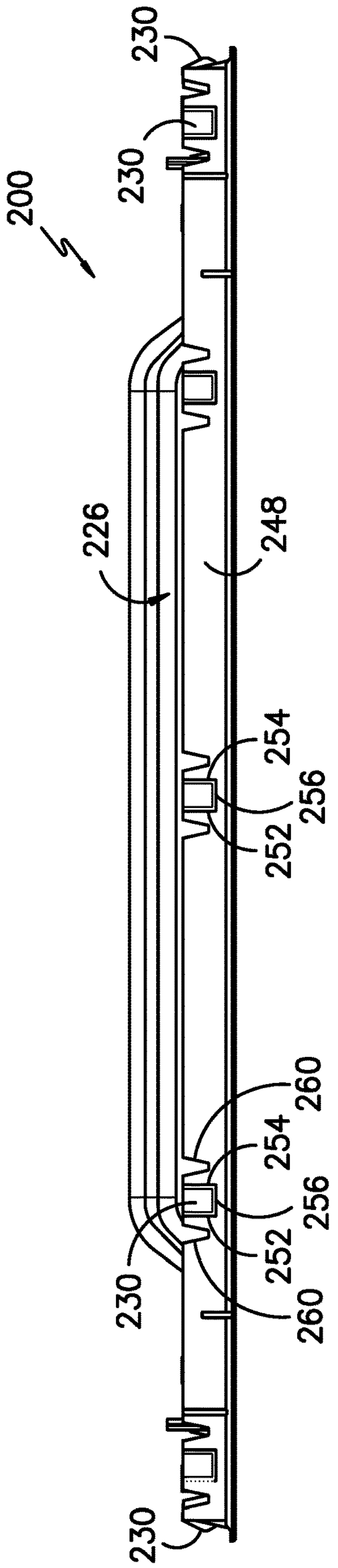
FIG. 9 provides an underside plan view of the exemplary pocket handle of FIG. 4.
Figure 10:
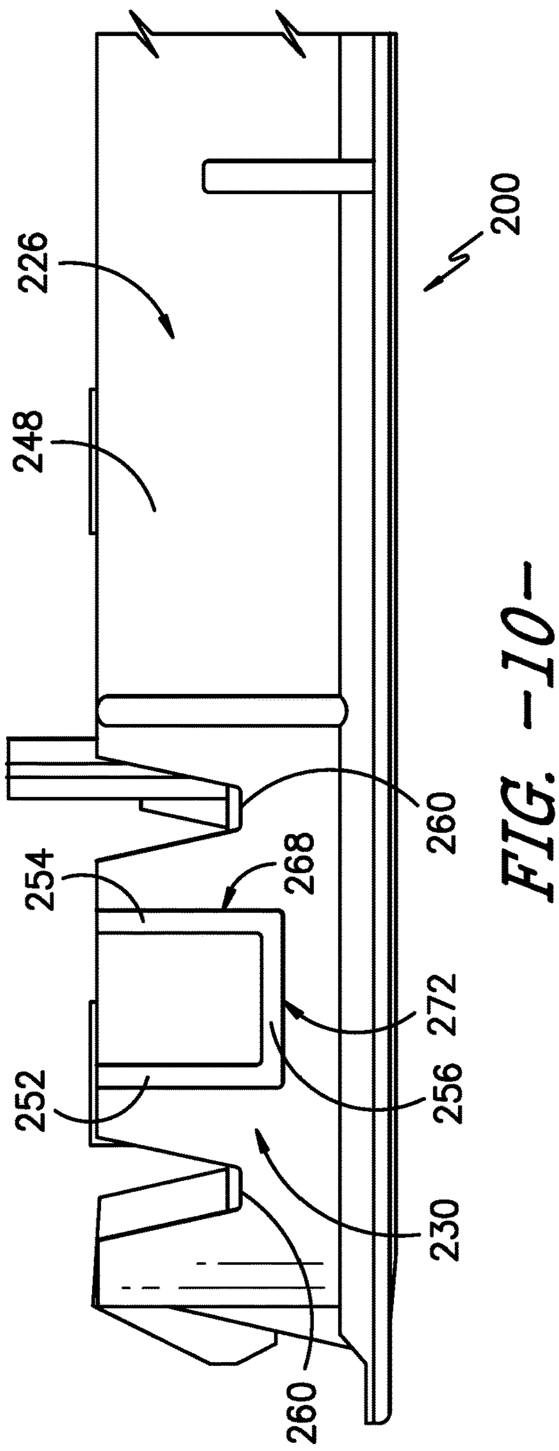
FIG. 10 provides a side perspective view of an embodiment of an exemplary clip of the exemplary handle of FIG. 4.
Figure 11:
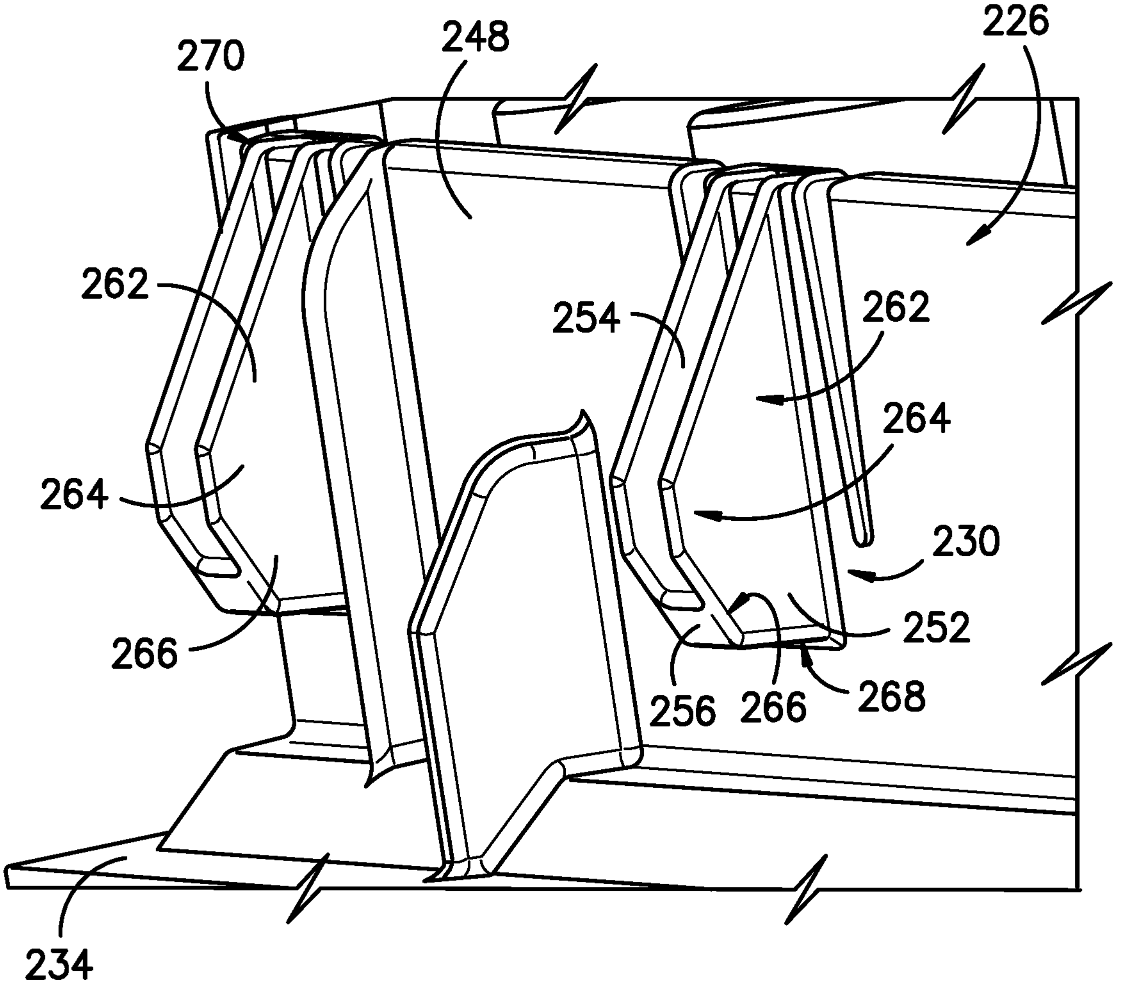
FIG. 11 provides a side perspective view of the exemplary clip of FIG. 10.

As will be described in detail below, snaps 230 may have several parts. For instance, snap 230 may include at least one wedge 252, 254. In further embodiments, snap 230 includes a dual wedge made up of wedges 252, 254. Additionally or alternatively, snap 230 may include a support bar 256, as shown in FIGS. 9 through 11. In optional embodiments, notches 260 may be placed on either side of snaps 230 (e.g., to allow one or more snaps 230 to flex during installation of handle 200).

As shown especially in FIGS. 12 and 13, in certain embodiments, snaps 230 include one or more wedges 252, 254. Wedges 252, 254 may form dual wedge 253. Dual wedge 253 is located on an outer surface of snap 230, with each wedge forming a side of snap 230. Generally, dual wedge 253 extends roughly orthogonal to handle lip 234. Furthermore, dual wedge 253 further extends along inner surface 226 of handle 200. In certain embodiments, each dual wedge 253 located on lower lateral length 248 extends roughly orthogonal to handle lip 234 and to lower lateral length 248. In turn, in certain embodiments, each dual wedge 253 located on vertical sides 250 may extend roughly orthogonal to handle lip 234 and to vertical sides 250. In some embodiments, dual wedge 253 may be internal to notches 260, which will be described hereafter.

Turning to FIGS. 11 and 12, each wedge 252, 254 in dual wedge 253 includes a wedge ridge 262, a wedge peak 264, and a wedge ramp 266. In some embodiments, dual wedge 253 is connected to support bar 256. As shown, wedge ramp 266 may be connected to support bar 256 at a ramp edge 268.

In certain embodiments, each wedge 252, 254 has a simple mountain or plateau type shape, beginning with wedge ridge 262 rising from inner surface 226, wedge ridge 262 gradually increasing in its extension from inner surface 226 until it meets with wedge peak 264. Wedge peak 264 may be a portion of wedge 252, 254 that extends in a consistent length from inner surface 226. Wedge ridge 262 begins at the end of wedge peak 264, gradually declining to ramp edge 268. As such, in certain embodiments, wedge 252, 254 takes on a taper on either edge, namely wedge ridge 262 and wedge ramp 266, with wedge peak 264 between wedge ridge 262 and wedge ramp 266.

In some embodiments, wedge peak 264 may be a corner between wedge ridge 262 and wedge ramp 266, forming a vertex between each of wedge ridge 262 and wedge ramp 266. Though not shown in FIGS. 11 and 12, wedge 252, 254 may form a "V" shape in some embodiments. For example, wedge 252, 254 may begin with wedge ridge 262 rising from inner surface 226, wedge ridge gradually increasing in its extension from inner surface 226 until it reaches wedge peak 264. Wedge peak 264, in this example, may form a point or peak that forms a maximum length of wedge 252, 254 from inner surface 226. Wedge ridge 262 then may begin at the end of wedge peak 264, gradually declining to ramp edge 268.

Additionally or alternatively, wedge ridge 262 has a tapered shape, the tapered shape advantageously aiding in sliding handle 200 into handle cavity 220 during installation of handle 200. Similarly, wedge ramp 266 has a tapered shape that may allow snap 230 to lodge with flange 240 during installation of handle 200 in handle cavity 220. Furthermore, in some embodiments, tapered shape of wedge ramp 266 aids in securing flange 240, lodging it with snap 230 at ramp edge 268 when handle 200 is in final, assembled position.

In different embodiments, different angles, or severity of tapered shape in wedge ridge 262 and wedge ramp 266 may be used. In general, tapered shape of wedge ridge 262 and wedge ramp 266 generates a highest vertex or ledge at wedge peak 264 and decreases toward inner surface 226 at ends (e.g., ramp edge 268 and a ridge edge 270) of wedge ridge 262 and wedge ramp 266.

As shown especially in FIGS. 4, 9, 10, 12, and 16, dual wedge 253 each includes a support bar 256. Support bar 256 may generally be a bar extending from inner surface 226, extending generally orthogonal from inner surface 226. In some embodiments, support bar 256 is perpendicular to dual wedge 253. Support bar 256 may further be orthogonal from the tapered shape of wedge ridge 262. As shown, support bar 256 connects each wedge 252, 254, extending between wedge 252 and wedge 254 in dual wedge 253. Additionally or alternatively, support bar 256 extends from each ramp edge 268 on wedge 252 and wedge 254. Generally, support bar 256 extends orthogonally from each wedge ramp 266 of wedge 252 and wedge 254.

Figure 16:
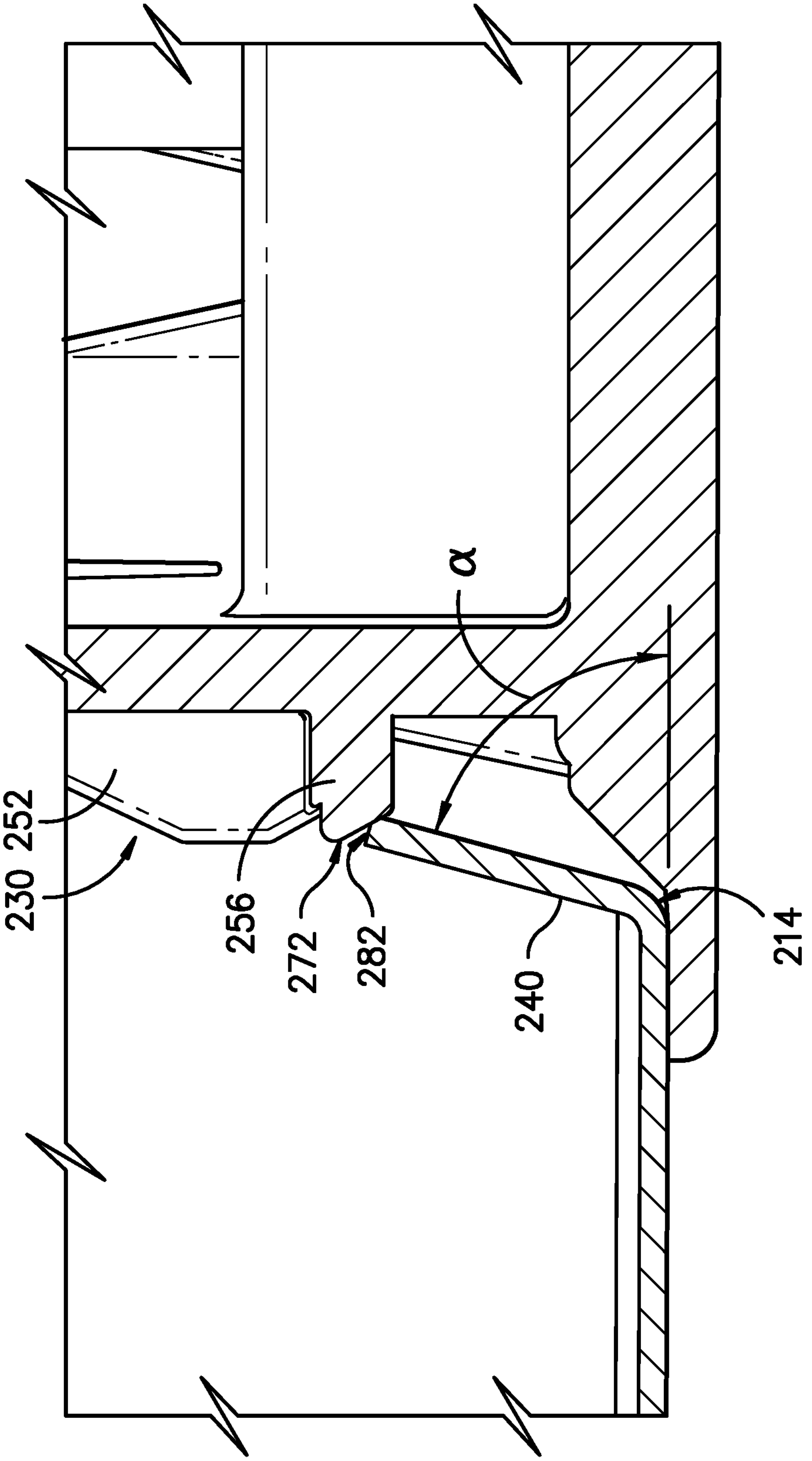
FIG. 16 provides a cross-sectional perspective view of the exemplary clip of FIG. 9 and a portion of the exemplary door of FIG. 3.

In some embodiments, each support bar 256 is lodged with each flange 240. Flange 240 may shave off a portion of support bar 256 during installation of handle 200, lodging flange 240 in outer bar surface 272, as shown in FIG. 16. In the illustrated embodiments, lodging flange 240 in outer bar surface 272 on support bar 256 adds strength to retention force of connection between flange 240 and snap 230. Furthermore, support bar 256 may aid in prevention of snaps 230 being sheared off during assembly of handle 200 into door 120, providing added stability to snaps 230 and aligning wedges 252, 254 with flange 240 during placement of handle 200 into door 120.

During use, a plurality of notches 260 may aid in flexibility of snaps 230. Notches are shown in FIGS. 4, 6, 8 through 13, and 17. Notches 260 are a portion of lower lateral length 248 or vertical sides 250 that extend out into door cavity 212 less than snap 230 or surrounding lower lateral length 248. Notches 260 may take a "v" shape in some embodiments. In certain embodiments, notches 260 may be a slit between snaps 230 and remaining lower lateral length 248 or vertical sides. In additional or alternative embodiments, notches 260 may have a U-shape. Optionally, notches may be defined as a trapezoid removed from lower lateral length 248 or vertical sides 250.

Generally, each snap 230 may be adjacent to at least one notch 260 of the plurality of notches 260. In some embodiments, each snap 230 is surrounded by two notches, one on either side of snap 230. In certain embodiments, notches 260 on either side of each snap 230 permit flex of each snap 230. Each snap 230 may flex relative to lower lateral length 248 or vertical sides 250. Such flexing can allow handle 200 to secure into door 120 during installation, as snap 230 flexes opposite to flanges 240, which, as will be described in more detail below, may also be configured to flex during installation of handle 200 in door 120.

Additionally or alternatively, snaps 230 may flex inwardly, in a direction away from handle cavity edge 214, during installation of handle 200 into door 120. Notches 260 allow movement of snaps 230 during installation of handle 200. In some embodiments, upon completion of installation of handle 200, snaps 230 are lodged with flanges 240. Following installation, snaps 230 may remain in place with flanges 240.

Turning especially to FIGS. 12, 13, 16 and 17, flanges 240 are aligned with snaps 230. Additionally or alternatively, the handle cavity edge 214 includes a plurality of flanges 240 angled into door cavity 212. Generally, one or more snaps 230 are lodged against one or more corresponding flanges 240 of the plurality of flanges 240 to attach handle 200 to front panel 202 of door 120. Each flange 240 extends from handle cavity edge 214, angled inward, into door cavity 212. Flanges 240 are arranged around handle cavity edge 214, each flange 240 positioned to align with a final position of each snap 230 on handle 200. In some embodiments, flanges 240 may be arranged along a bottom lateral length 276 of handle cavity edge 214. In certain embodiments, flanges 240 are arranged along side lengths 278 of handle cavity edge 214 and to bottom lateral length 276. Additionally or alternatively, flanges 240 may be arranged along a top lateral length 280 of handle cavity edge 214.

In some embodiments, flanges 240 are formed as a portion of door front panel 202. For instance, front panel 202 may be a single piece of formed metal, including sheeted metal, extruded metal, stamped metal, or forged metal, with flanges 240 formed as a part of front panel 202 during metal forming of front panel 202. In alternative embodiments, flanges 240 are attached to front panel 202 as discrete members at handle cavity edge 214.

Figure 17:
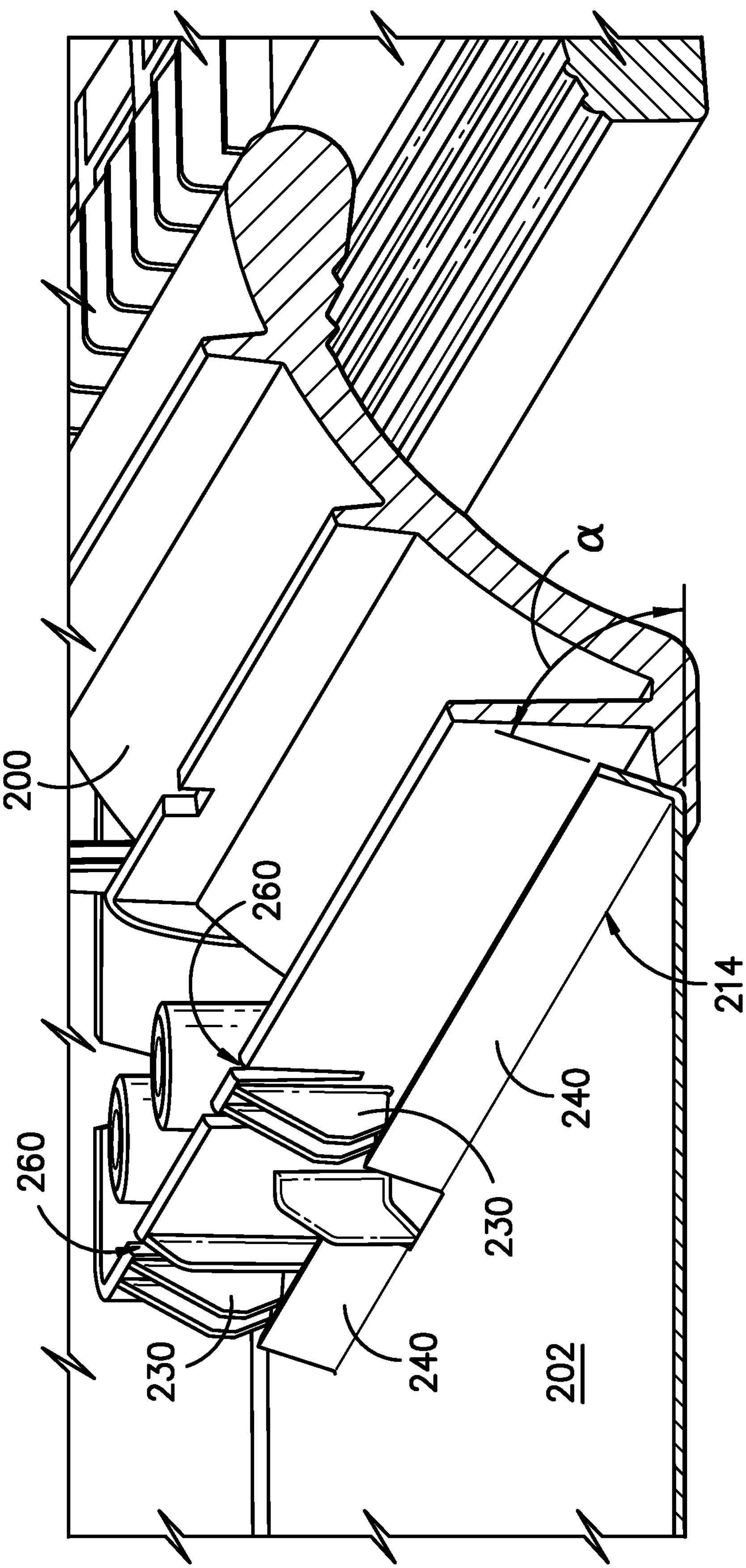
FIG. 17 provides an alternate cross-sectional perspective view of the exemplary clip of FIG. 9 and a portion of the exemplary door of FIG. 3.

According to some embodiments, each flange 240 has a rectangular or trapezoidal shape, when viewed from the side facing the handle 200. Further, each flange 240 has a flange edge 282. Flange edge 282 is attached to snap 230. In some embodiments, flange edge 282 lodges into snap 230. As shown, flange edge 282 lodges into wedge ramp 266 at ramp edge 268. In embodiments where snap 230 includes support bar 256, flange edge 282 may lodge into support bar 256 (as shown in FIGS. 12 and 16). During installation of handle 200 into door 120, flange edge 282 may shear off a minimal portion of snap 230, including a portion of ramp edge 268, lodging flange edge 282 into snap 230. Additionally or alternatively, flanges 240 may be angled into door cavity 212. As shown in FIGS. 16 and 17, flanges 240 may be angled at an angle $\alpha$ with respect to the vertical direction V. Angle $\alpha$ is an acute angle.

In some embodiments, flanges 240 could include as few as three flanges, such as one on the bottom lateral length 276, and two located on either side length 278 of handle cavity edge 214. In some embodiments, flanges 240 could include more than three flanges 240, such as about 10 flanges or about 20 flanges. In certain embodiments, snaps 230 could correspond to the number of flanges 240 in appliance 100. In additional or alternate embodiments, there could be more snaps 230 than there are flanges 240, with multiple snaps 230 aligned with each flange 240. Generally, flanges 240 and snaps 230 are aligned such that each snap 230 is lodged against a flange 240 when handle 200 is installed in door 120.

Optionally, flanges 240 may flex away from handle 200 and snaps 230 during installation. In some embodiments, flanges 240 return to their original angle α when handle 200 is fully installed in door 120. Similarly, snaps 230 may flex away from flanges 240 during installation, with the aid of notches 260 allowing snaps 230 to flex. As shown, snaps 230 return to their original position when handle 200 is fully installed in door 120. In certain embodiments, flanges 240 shave off a portion of snaps 230 during installation of handle 200, and lodge flange edge 282 slightly into wedge ramp 266 of snap 230 in final installation position of handle 200.

Additionally or alternatively, handle 200 may include a front lip 284. Front lip 284 may be located along a length of handle lip 234. In certain embodiments, front lip 284 is a portion of top lateral length 280. In some embodiments, front lip 284 is located in between snaps located along top lateral length 280. In additional or alternative embodiments, front lip 284 may extend the full length of top lateral length 280.

Figure 15:
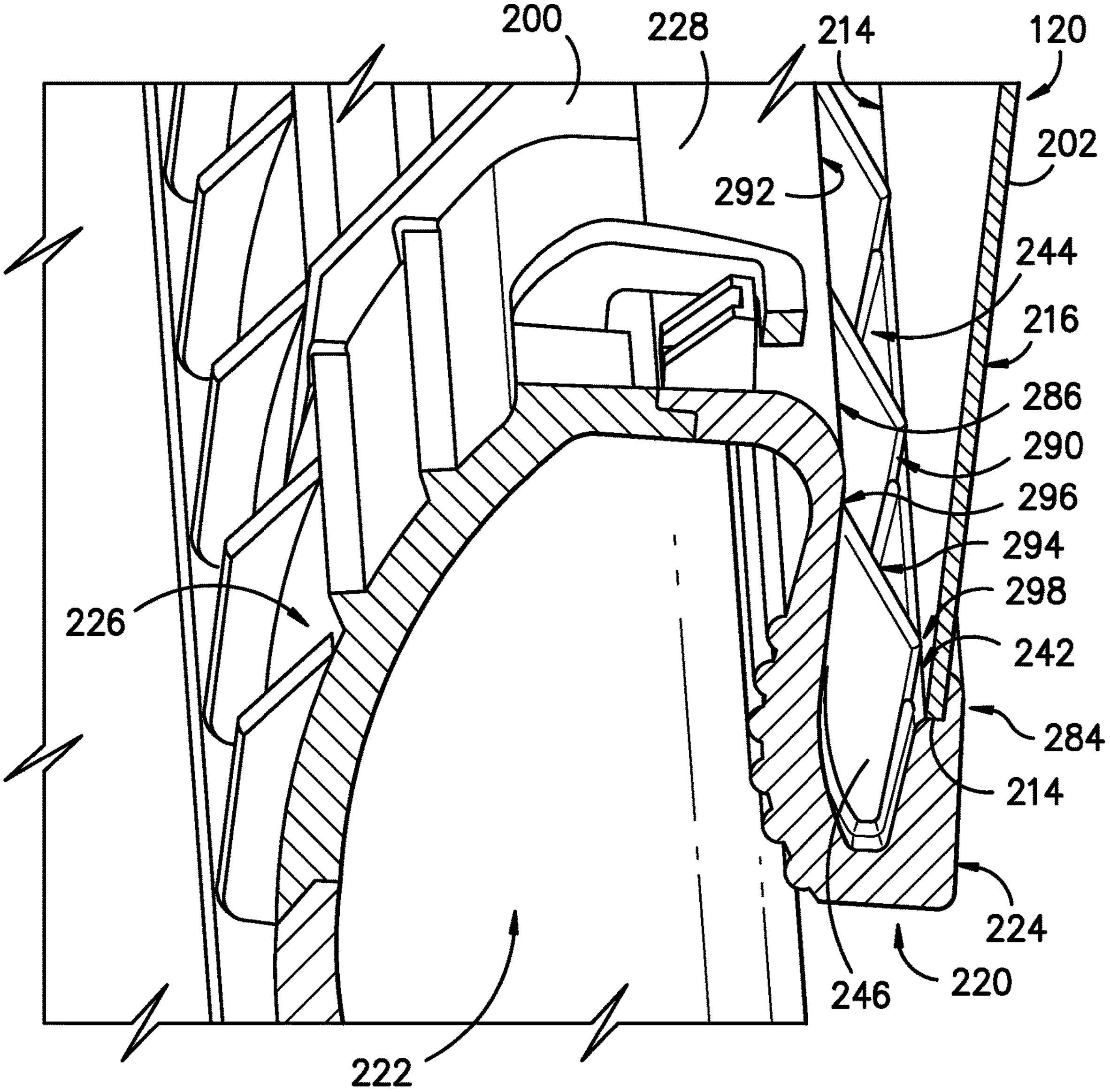
FIG. 15 provides a cross-sectional, perspective view of the exemplary pocket handle and exemplary door of FIGS. 3 and 4.

In some embodiments, front lip 284 extends beyond handle cavity edge 214 and onto front panel 202. As shown in FIGS. 14 and 15, front lip 284 covers a portion of front surface 216 at handle cavity edge 214. Front lip 284 is attached to front surface 216 proximate to handle cavity edge 214. Front lip 284 is proud of front surface 216. As such, front lip 284 is proud of front panel 202 and door 120. Front lip 284 is transversely forward of front surface 216. Additionally or alternatively, front lip 284 is transversely forward of front panel 202 and door 120.

Continuing with FIGS. 14 and 15, inner surface 226 includes a front edge 242. Front edge 242 is located along handle cavity edge 214. When assembled, front edge 242 extends beyond handle cavity edge 214. Front edge 242 is located transversely behind front lip 284. Front edge 242 extends transversely behind a length of handle lip 234, front edge 242 aligning with front lip 284, front lip 284 and front edge 242 extending roughly parallel to one another in a lateral direction L. For instance, front lip 284 may be a portion of top lateral length 280 with front edge 242 running parallel and transversely behind front lip 284.

In additional or alternative embodiments, handle 200 defines a U-shaped cavity 244 between front lip 284 and front edge 242. As shown, handle cavity edge 214 may be secured in U-shaped cavity 244. In some embodiments, front lip 284 seats a portion of handle cavity edge 214 in U-shaped cavity 244. In the illustrated embodiment, U-shaped cavity 244 extends the length of front lip 284 and front edge 242. For instance, U-shaped cavity 244 may extend between snaps 230 along top lateral length 280. In certain embodiments, U-shaped cavity 244 extends the length of top lateral length 280. In additional or alternate embodiments, snaps 230 may be placed next to U-shaped cavity 244, front edge 242 and front lip 284. In turn, flanges 240 may be placed next to U-shaped cavity along handle cavity edge 214.

In some embodiments, handle 200 is further attached to door 120 by way of a U-shaped cavity 244 formed by a front edge 242 and a set of ribs 246 on handle outer surface 224. In certain embodiments, front edge 242 is at least partially defined by a plurality of ribs 246. Each rib 246 is spaced apart along handle cavity edge 214. In some embodiments, each rib 246 is equidistant from the other ribs. In certain embodiments, ribs 246 are placed closer or farther apart from one another at different portions of front edge 242.

Generally, ribs 246 are located behind U-shaped cavity 244. In some embodiments, ribs 246 are located transversely inward from U-shaped cavity 244. As shown, front edge 242 may include a transversely forward rib edge 290 of each rib 246. Rib edge 290 extends roughly orthogonal to front panel 202. Rib edge 290 and front lip 284 further seat a portion of handle cavity edge 214 in U-shaped cavity 244. For example, rib edge 290 and front lip 284 may seat top lateral length 280 of handle cavity edge 214. In some embodiments, rib edge 290 forms a leg of U-shaped cavity 244, such as a transversely backwards side leg.

As shown in FIGS. 14 and 15, each rib 246 includes a back edge 292. Back edge 292 connects rib 246 to handle interior panel 228. In the illustrated embodiment, a lead in taper 294 extends between back edge 292 and rib edge 290, lead in taper 294 including a length stretching vertically above the rest of rib 246. Generally, lead in taper 294 connects front edge 242 to back edge 292. For instance, lead in taper 294 may extend toward the internal chamber (e.g., wash chamber 106). In some embodiments, lead in taper 294 may slant from an upper position 296 on handle interior panel 228 to a lower position 298 at rib edge 290 and front edge 242.

Ribs 246 are shaped as fins abutting front panel 202. In some embodiments, ribs 246 are shaped to guide handle 200 into door 120 during installation. In certain embodiments, ribs 246 are further shaped to support and aid in preventing handle 200 from falling out of door 120 when handle 200 is fully installed. During use, snaps 230 in connection with flanges 240, and ribs 246 in connection with handle cavity edge 214 may notably add strength to overcome a force to open door 120 using handle 200.

According to the arrangement, handle 200 may be rotated into door 120 during installation of handle 200 into door 120. In some embodiments, handle 200 connects ribs 246 and top lateral length to handle cavity edge 214 first, and then rotates the remaining lengths of handle 200, with accompanying snaps 230, into place, aligning flanges 240 to snaps 230, until handle 200 is installed with handle lip 234 abutting handle cavity edge 214 and proud of front surface 216.

In certain embodiments, ribs 246 may be replaced by a wall (not shown) that extends along handle cavity edge 214, front edge 242 extending along a transversely front facing side (not shown) of the wall. In certain embodiments, the U-shaped cavity 244 with ribs 246 or wall (not shown) may be used on more than one side of handle 200 (e.g., top lateral length 280, vertical sides 250), with flanges 240 and snaps 230 used on the remaining side or portions of sides (e.g., lower lateral length 248), the combination of U-shaped cavity 244 and snaps 230 and flanges 240 holding handle 200 in door 120. Other combinations of snaps 230 and flanges 240 on some sides of handle 200 with ribs 246 and U-shaped cavity 244 used on the remaining sides of handle 200 may also be used in certain embodiments.

As previously mentioned, in some alternate embodiments, recess 222 may not be present, with pocket for handle 200 extending only transversely and not vertically into door cavity 212. In such embodiments, handle lip 234 may have a plurality of snaps on all sides with handle cavity edge 214 including a corresponding plurality of flanges on all sides. In some such embodiments, there may be no U-shaped cavity 244 along a side of handle 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A household appliance with a vertical, transverse, and lateral direction defined in relation to a door, each direction orthogonal to one another, the household appliance comprising:
- a cabinet comprising a plurality of panels, the cabinet defining an internal chamber therein;
- a door mounted on the cabinet to selectively restrict access to the internal chamber in a closed position, the door extending along the vertical direction in the closed position between a top lip and a bottom lip, the door comprising a front panel and an interior panel, the front panel and the interior panel defining a door cavity between the front panel and the interior panel, the front panel comprising a handle cavity edge, the front panel defining a handle cavity at the handle cavity edge, and the handle cavity edge comprising a plurality of flanges angled into the door cavity; and
- a handle disposed in the handle cavity, the handle comprising an outer surface and an inner surface, the handle defining a recess extending into the door cavity between the front panel and the interior panel, the handle further comprising a plurality of snaps located on a periphery of the inner surface, one or more snaps of the plurality of snaps being lodged against one or more corresponding flanges of the plurality of flanges to attach the handle to the front panel of the door,
- wherein the handle further comprises a plurality of notches, each snap of the plurality of snaps being adjacent to at least one notch of the plurality of notches to permit flex of each snap of the plurality of snaps.

2. The household appliance of claim 1, wherein the handle further comprises a front lip, the front lip extending beyond the handle cavity edge and onto the front panel, and wherein the front lip is proud of the front panel.

3. The household appliance of claim 2, wherein the inner surface comprises a front edge located along the handle cavity edge, the front edge extending beyond the handle cavity edge, the handle defining a U-shaped cavity between the front lip and the front edge.

4. The household appliance of claim 3, wherein the front edge is at least partially defined by a plurality of ribs, each rib being spaced apart along the handle cavity edge.

5. The household appliance of claim 4, wherein each rib has a rib edge extending roughly orthogonal to the front panel, and wherein the rib edge of each rib and the front lip further seat a portion of the handle cavity edge in the U-shaped cavity.

6. The household appliance of claim 5, wherein each rib further comprises a lead in taper and a back edge, the lead in taper of each rib connecting the front edge to the back edge of a respective rib and extending toward the internal chamber.

7. The household appliance of claim 1, wherein the door further comprises a front surface, the handle further defining the recess in the transverse direction into the door toward the internal chamber and in the vertical direction, the recess extending behind the front surface of the door, into the door cavity and beyond the handle cavity.

8. The household appliance of claim 2, wherein the one or more snaps of the plurality of snaps comprise a dual wedge, the dual wedge extending roughly orthogonal to the front lip along the inner surface of the handle.

9. The household appliance of claim 8, wherein the one or more snaps of the plurality of snaps further comprises a support bar perpendicular to the dual wedge.

10. The household appliance of claim 1, wherein one or more flanges of the plurality of flanges are angled at an acute angle with respect to the vertical direction.

11. A household appliance, the household appliance comprising:
- a cabinet comprising a plurality of panels, the cabinet defining an internal chamber;
- a door mounted on the cabinet to selectively restrict access to the internal chamber in a closed position, the door comprising a front panel and an interior panel, a door cavity defined between the front panel and the interior panel, the front panel comprising a handle cavity edge, the front panel defining a handle cavity at the handle cavity edge and the handle cavity edge comprising a plurality of flanges angled into the door cavity; and
- a handle attached to the door in the handle cavity, the handle comprising an outer surface and an inner surface, the handle defining a recess at the handle cavity that extends into the door cavity between the front panel and the interior panel, the handle further comprising a plurality of snaps located on a periphery of the inner surface, one or more snaps of the plurality of snaps being lodged against one or more corresponding flanges of the plurality of flanges to attach the handle to the front panel of the door,
- wherein the handle further comprises a front lip, the front lip extending beyond the handle cavity edge and onto the front panel, and
- wherein the handle further comprises a plurality of notches, each snap of the plurality of snaps being adjacent to at least one notch of the plurality of notches to permit flex of each snap of the plurality of snaps.

12. The household appliance of claim 11, wherein the front lip is proud of the front panel and wherein the inner surface comprises a front edge located along the handle cavity edge and extends beyond the handle cavity edge, the handle defining a U-shaped cavity between the front lip and the front edge, the handle cavity edge secured in the U-shaped cavity.

13. The household appliance of claim 12, wherein the inner surface comprises a front edge located along the handle cavity edge and extends beyond the handle cavity edge, the handle defining a U-shaped cavity between the front lip and the front edge.

14. The household appliance of claim 13, wherein the front edge is at least partially defined by a plurality of ribs, each rib being spaced apart along the handle cavity edge.

15. The household appliance of claim 11, wherein one or more snaps of the plurality of snaps comprise a dual wedge, the dual wedge extending roughly orthogonal to the front lip along the inner surface of the handle.

16. The household appliance of claim 15, wherein the one or more snaps of the plurality of snaps further comprises a support bar perpendicular to the dual wedge and wherein one or more flanges of the plurality of flanges are angled at an acute angle with respect to a vertical direction.

17. A household appliance with a vertical, transverse, and lateral direction defined in relation to a door, each direction orthogonal to one another, the household appliance comprising:
- a cabinet comprising a plurality of panels, the cabinet defining an internal chamber therein;

a door mounted on the cabinet to selectively restrict access to the internal chamber in a closed position, the door extending along the vertical direction in the closed position between a top lip and a bottom lip, the door comprising a front panel and an interior panel, the front panel and the interior panel defining a door cavity between the front panel and the interior panel, the front panel comprising a handle cavity edge, the front panel defining a handle cavity at the handle cavity edge, and the handle cavity edge comprising a plurality of flanges angled into the door cavity; and a handle disposed in the handle cavity, the handle comprising an outer surface and an inner surface, the handle defining a recess extending into the door cavity between the front panel and the interior panel, the handle further comprising a plurality of snaps located on a periphery of the inner surface, one or more snaps of the plurality of snaps being lodged against one or more corresponding flanges of the plurality of flanges to attach the handle to the front panel of the door, wherein the handle further comprises a front lip, the front lip extending beyond the handle cavity edge and onto the front panel, and wherein the front lip is proud of the front panel, and wherein the one or more snaps of the plurality of snaps comprise a dual wedge, the dual wedge extending roughly orthogonal to the front lip along the inner surface of the handle.

18. The household appliance of claim 17, wherein the one or more snaps of the plurality of snaps further comprises a support bar perpendicular to the dual wedge.

19. The household appliance of claim 17, wherein one or more flanges of the plurality of flanges are angled at an acute angle with respect to the vertical direction.

20. The household appliance of claim 17, wherein the door further comprises a front surface, the handle further defining the recess in the transverse direction into the door toward the internal chamber and in the vertical direction, the recess extending behind the front surface of the door, into the door cavity and beyond the handle cavity.

* * * * *